(12) United States Patent
Mohiuddin

(10) Patent No.: US 9,100,487 B1
(45) Date of Patent: Aug. 4, 2015

(54) CONDITIONAL VOICEMAIL ROUTING IN WIRELESS COMMUNICATION NETWORKS

(71) Applicant: Sprint Communications Company L.P., Overland Park, KS (US)

(72) Inventor: Mohammed Ghouse Mohiuddin, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 232 days.

(21) Appl. No.: 13/705,807

(22) Filed: Dec. 5, 2012

(51) Int. Cl.
*H04M 11/10* (2006.01)
*H04M 3/533* (2006.01)
*H04W 4/12* (2009.01)
*H04W 4/16* (2009.01)

(52) U.S. Cl.
CPC ............. *H04M 3/533* (2013.01); *H04W 4/12* (2013.01); *H04M 3/53333* (2013.01); *H04W 4/16* (2013.01)

(58) Field of Classification Search
CPC ... H04M 3/533; H04M 3/53333; H04W 4/16; H04W 4/00

USPC ................ 455/412.1, 412.2, 413, 414.1, 445; 379/88.12, 88.18, 88.22
See application file for complete search history.

(56) References Cited

U.S. PATENT DOCUMENTS

| | | | |
|---|---|---|---|
| 2003/0152201 A1* | 8/2003 | Snelgrove et al. ......... | 379/88.22 |
| 2007/0274465 A1* | 11/2007 | Othmer ........................ | 379/67.1 |
| 2012/0033610 A1* | 2/2012 | Ring et al. .................... | 370/328 |
| 2013/0065561 A1* | 3/2013 | Eichen et al. ................ | 455/413 |

* cited by examiner

*Primary Examiner* — Olumide T Ajibade Akonai

(57) ABSTRACT

Systems, methods, and software for operating a wireless communication system are provided herein. In one example, method of operating a wireless communication system is provided. The method includes processing a voice call directed to a user device and alerting the user device of the voice call, determining that the user device has not answered the voice call, and determining a status of the wireless communication system. When the status of the wireless communication system indicates a first condition, then the method includes initiating a first connection for the voice call to a voicemail service for the wireless communication system. When the status of the wireless communication system indicates a second condition, then the method includes initiating a second connection for the voice call to a voicemail service on the user device.

14 Claims, 6 Drawing Sheets

CONDITIONAL VOICEMAIL ROUTING IN WIRELESS COMMUNICATION NETWORKS

TECHNICAL FIELD

Aspects of the disclosure are related to the field of communications, and in particular, routing voice calls to various voicemail services in wireless communication networks.

TECHNICAL BACKGROUND

Wireless communication systems typically include wireless access systems or radio access networks with equipment such as wireless access nodes and various control/routing nodes, which provide wireless access to communication services for user devices over wireless links. A typical wireless communication system includes systems to provide wireless access across a geographic region, with wireless coverage areas associated with individual wireless access nodes. The wireless access systems exchange user communications between user devices and service providers for the communication services. Communication services typically include voice calls, data exchange, web pages, streaming media, or text messages, among other communication services.

When a voice call is placed to a user device, the user device is typically alerted to the incoming voice call and the user of the user device can elect to answer the voice call or reject the voice call. Voicemail systems typically handle recording voice messages related to missed or rejected voice calls, and can be found in discrete voicemail services of the wireless communication systems. In some examples, alternative voicemail services are employed where voicemail handling and processing features are included on the user devices themselves, such as in smartphone voicemail applications and visual voicemail systems.

To handle a missed or rejected voice call when a user device voicemail service is employed, the wireless communication system typically routes the voice call to the user device for handling of the missed or rejected voice call by a voicemail service located on the user device. However, live routing of the voice call itself to the voicemail service of the user device can create congestion and use limited resources of the wireless communication system. Also, routing of recorded voicemail data from a voicemail service of the wireless communication system to a user device can also create undesirable congestion of the limited resources of the wireless communication system.

Overview

Systems, methods, and software for operating a wireless communication system are provided herein. In one example, method of operating a wireless communication system is provided. The method includes processing a voice call directed to a user device and alerting the user device of the voice call, determining that the user device has not answered the voice call, and determining a status of the wireless communication system. When the status of the wireless communication system indicates a first condition, then the method includes initiating a first connection for the voice call to a voicemail service for the wireless communication system. When the status of the wireless communication system indicates a second condition, then the method includes initiating a second connection for the voice call to a voicemail service on the user device.

In another example, a wireless communication system is provided. The wireless communication system includes a network element configured to process a voice call directed to a user device and alert the user device of the voice call, determine that the user device has not answered the voice call, and determine a status of the wireless communication system. When the status of the wireless communication system indicates a first condition, then the network element is configured to initiate a first connection for the voice call to a voicemail service for the wireless communication system. When the status of the wireless communication system indicates a second condition, then the network element is configured to initiate a second connection for the voice call to a voicemail service on the user device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
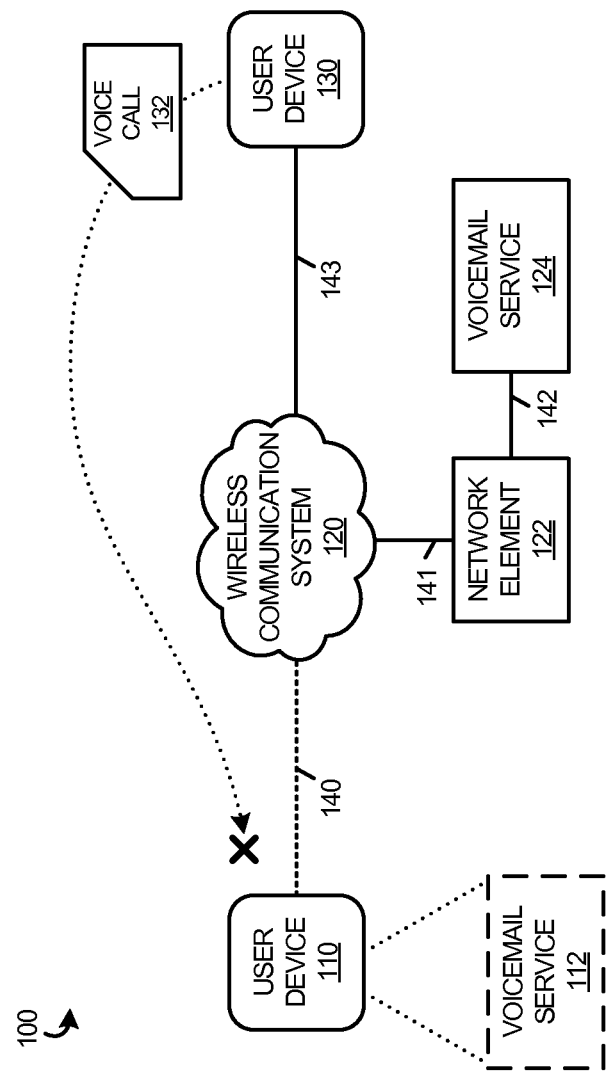
FIG. 1 is a system diagram illustrating a communication system.

FIG. 1 is a system diagram illustrating communication system 100. Communication system 100 includes user device 110, wireless communication system 120, network element 122, voicemail service 124, and user device 130. User device 110 and wireless communication system 120 communicate over wireless link 140. Wireless communication system 120 and network element 122 communicate over link 141. Network element 122 and voicemail service 124 communicate over link 142. User device 130 and wireless communication system 120 communicate over link 143. In further examples, voicemail service 124 communicates over link 142 with elements of communication network 120.

In operation, user device 110 receives wireless access to communication services from wireless communication system 120. The communication services can include voice calls, text messages, data access, or other communication services. User device 110 can also receive voice calls initiated by other user devices, such as user device 130. User device 130 can receive access to communication services from wireless communication system 120 or can receive access to communication services from a further communication network and have voice calls or other communications routed over at least link 143 to wireless communication system 120. In this example, user device 130 initiates voice call 132 to user device 110. Voice call 132 can originate at user device 130 and an associated communication network, such as wireless communication system 120 or another communication network and routed over link 143.

Figure 2:
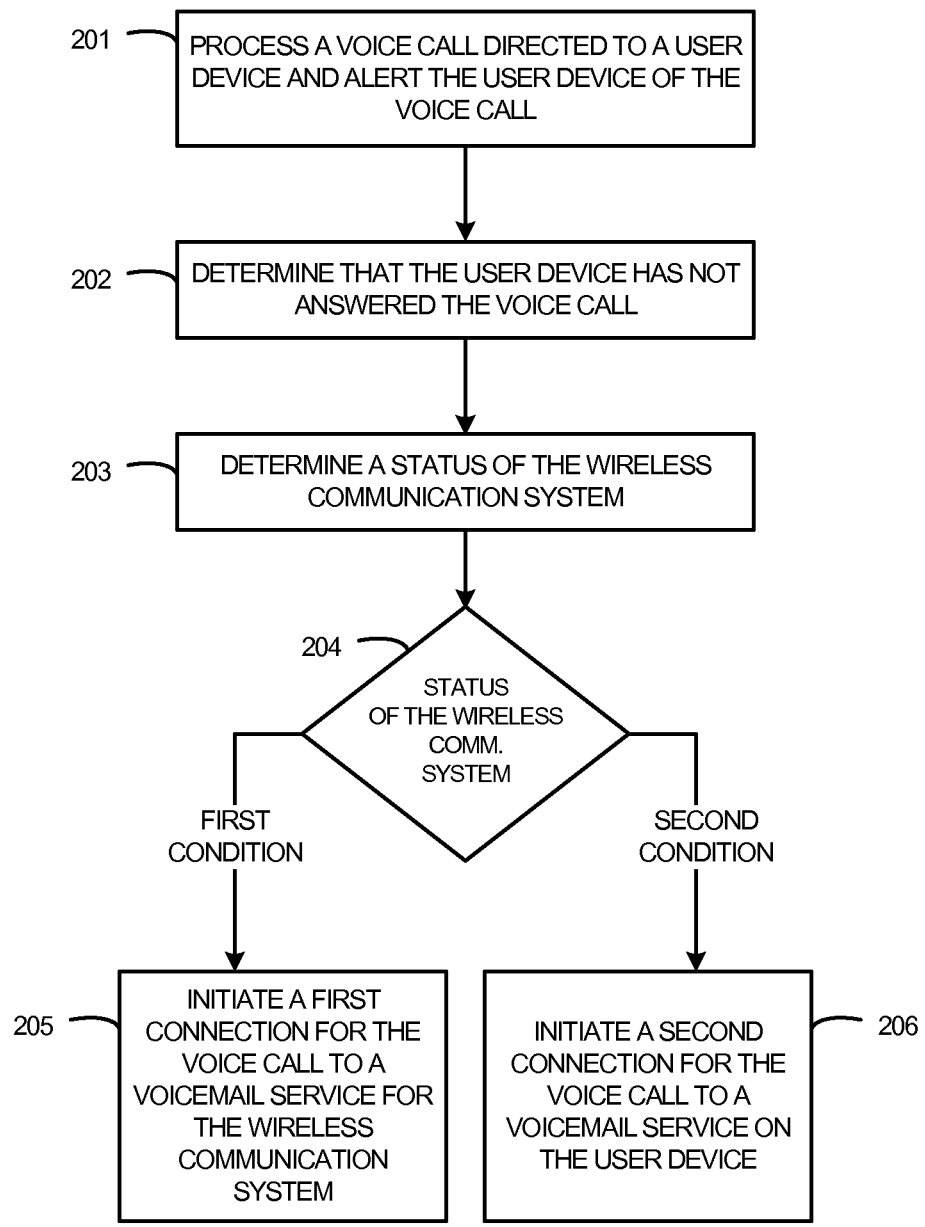
FIG. 2 is a flow diagram illustrating a method of operation of a communication system.

FIG. 2 is a flow diagram illustrating a method of operation of communication system 100. The operations of FIG. 2 are referenced below parenthetically. In FIG. 2, network element 122 processes (201) a voice call directed to user device 110 and alerts user device 110 of the voice call. In this example, the voice call directed to user device 110 is voice call 132. User device 130 can initiate voice call 132 for a communication session with user device 110. In some examples, user device 130 receives access to communication services from wireless communication system 120 and link 143 can include a wireless link. In other examples, user device 130 receives access to communication services from another communication system, such as a public switched telephone network (PSTN) or other communication network, and voice call 132 is routed over link 143.

An indication of voice call 132 is received or detected by network element 122 or other elements of wireless communication system 120. Voice call 132 is then routed for delivery to user device 110, over wired and wireless links, such as elements of wireless communication system 120 and wireless link 140. An indication of voice call 132 is used to alert user device 110 of voice call 132, and can include a call page, incoming call alert, or other incoming call indication.

Network element 122 determines (202) that user device 110 has not answered voice call 132. User device 110 might not answer voice call 132 due to being engaged in a pre-existing communication session, such as another voice call, data session, or other communication session. User device 110 might not answer voice call 132 due to a user command received at user device 110 to ignore or to otherwise reject voice call 132, such as via a user interface of user device 110. User device 110 might not answer voice call 132 due to a user of user device 110 not being present to answer voice call 132. When user device 110 does not answer voice call 132, such as via a user-initiated rejection command, after a predetermined number of rings, or after predetermined time period without an answer by user device 110, then network element 122 can determine that user device 110 has not answered voice call 132.

Network element 122 determines (203) a status of wireless communication system 120. Network element 122 or further elements of wireless communication system 120 can monitor a status of wireless communication system 120. The status can be based on an activity level of elements of wireless communication system 120, a time of day, a congestion level for elements of wireless communication system 120, or activity level/congestion of wireless link 140, among other status monitoring. When the particular status or statuses being monitored cross an applicable threshold or thresholds, then a first condition or a second condition can be met.

When the status of wireless communication system 120 indicates a first condition (205), then network element 122 initiates a first connection for voice call 132 to a voicemail service for wireless communication system 120. The first condition can include when an activity level of elements of wireless communication system 120 exceeds a first threshold level, such as when a congestion of elements of wireless communication system 120 exceeds a first congestion threshold. Other status, such as time of day can indicate if the first condition is met.

Responsive to user device 110 not answering voice call 132 and the first condition being indicated, network element 122 initiates a first connection for voice call 132 to voicemail service 124. Initiating the first connection can include indicating to elements of wireless communication system 120 to route voice call 132 to voicemail service 124 instead of user device 110. Network element 122 can indicate an incoming voice call to voicemail service 124. Network element 122 can route voice call 132 for delivery to voicemail service 124.

When the status of wireless communication system 120 indicates a second condition (206) then network element 122 initiates a second connection for voice call 132 to a voicemail service on user device 110. The second condition can include when an activity level of elements of wireless communication system 120 fall below the first threshold level, such as when a congestion of elements of wireless communication system 120 fall below the first congestion threshold. Other status, such as time of day can indicate if the second condition is met. In further examples, a second threshold status is employed, and the second condition is indicated when the second threshold is exceeded.

Responsive to user device 110 not answering voice call 132 and the second condition being indicated, network element 122 initiates a second connection for voice call 132 to voicemail service 112 of user device 110. Initiating the second connection can include indicating to elements of wireless communication system 120 to route voice call 132 to voicemail service 112 of user device 110. Network element 122 can route voice call 132 for delivery to voicemail service 112. In some examples, initiating the second connection for voice call 132 to voicemail service 112 of user device 110 can include initiating a data connection over wireless link 140 for delivery of voice call 132 into voicemail service 112 of user device 110.

In yet further examples, when the status of elements of wireless communication system 120 initially indicate the first condition and subsequently indicate the second condition, then voicemail service 124 can transfer, for delivery to user device 110, the voicemail data resulting from the voice call. Voicemail service 124 can transfer, for delivery to voicemail service 112 of user device 110, the voicemail resulting from the voice call. Indications of one or more captured voicemails can be transferred by voicemail service 124 to user device 110. A user of user device 110 can elect via a user interface of user device 110 to retrieve the voicemails captured by voicemail service 124.

Although many of the operations in FIG. 2 are described above as being performed by network element 122, it should be understood that other network elements or portions of wireless communication system 120 can perform the above operations. Network 122 is used in this example for clarity and brevity, and it should be understood that the operations of FIG. 2 can be distributed across one or more elements associated with wireless communication system 120.

Figure 3:
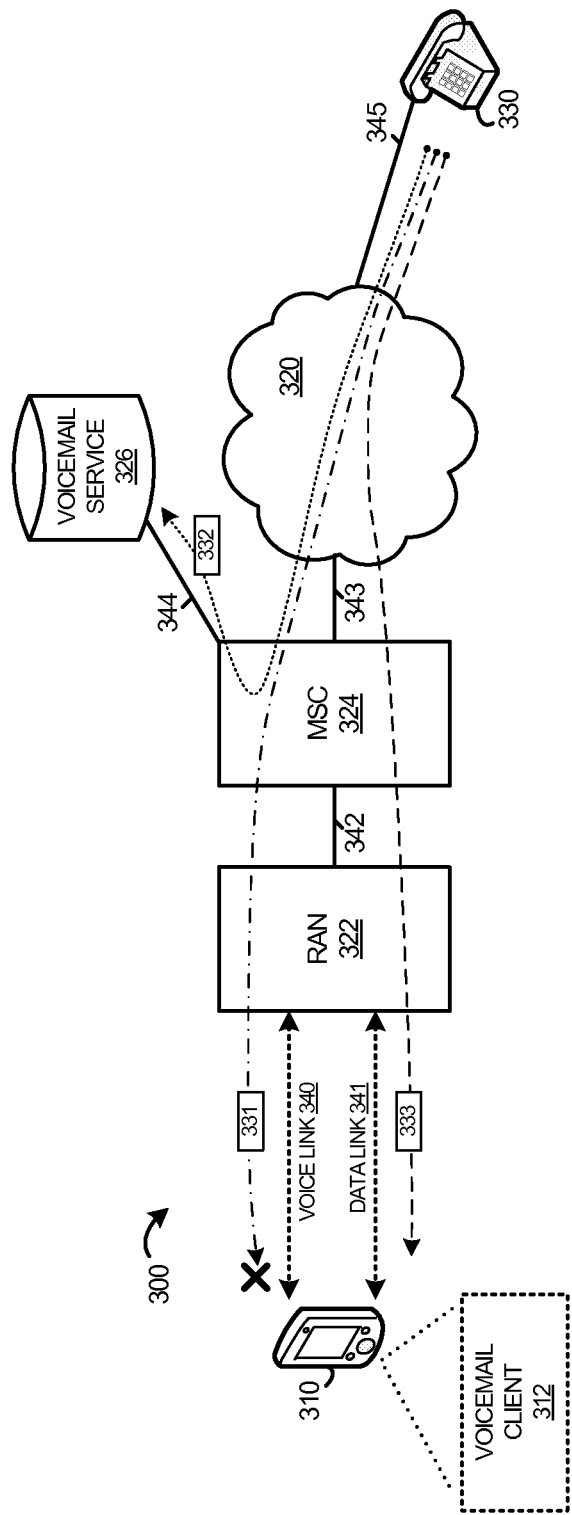
FIG. 3 is a system diagram illustrating a communication system.

FIG. 3 is a system diagram illustrating communication system 300. Communication system 300 includes smartphone device 310, cellular voice and data system (CVDS) 320, radio access network (RAN) 322, mobile switching center (MSC) 324, voicemail service 326, and telephone 330. Elements 320-326 can comprise a communication network or multiple communication networks such as wireless communication system 120 found in FIG. 1, although variations are possible. In operation, elements 320-326 provide wireless access to communication services for at least smartphone device 310. Elements associated with CVDS 320 can be distributed across a geographic area to provide cellular voice and data coverage to user devices.

Smartphone device 310 includes voicemail client 312 in this example. Voicemail client 312 can be a software application and comprise executable instructions stored on a computer-readable medium of smartphone device 310. Voicemail client 312 can include databases, storage locations for storing voicemail data, and user interface elements for interacting with a user of smartphone device 310 to indicate, retrieve, and store voicemail data. In some examples, voicemail client 312 is installed onto smartphone device 310 by a user of smartphone device 312, or is preinstalled by a manufacturer or equipment retailer of smartphone device 310. Voicemail client 312 can communicate with various transceiver and user interface elements of smartphone device 310, such as those described herein for user device 600 of FIG. 6.

Smartphone device 310 and RAN 322 communicate over ones of wireless links 340-341. In this example, wireless link 340 comprises a 1xRTT cellular voice link and wireless link 341 comprises a CDMA cellular data link, although other cellular communication protocols can be employed, such as GSM, WiMAX, LTE, or those discussed herein for wireless link 140 of FIG. 1. RAN 322 and MSC 324 communicate over backhaul link 342 which is at least one T1 link in this example. Link 342 can include data and voice portions, which can include packet communications, circuit-switched communications, or time-division communications, including combinations or variations thereof. MSC 324 and CVDS 320 communicate over optical networking link 343. MSC 324 and voicemail service 326 communicate over optical networking link 344. CVDS 320 and telephone 330 communicate over link 345 which can include a cellular wireless link or alternatively a circuit switched voice link, among other link types.

CVDS 320 comprises communication and control systems for providing access to communication services for user devices, and can include core network functionality for a wireless communication system. In some examples, CVDS 320 includes equipment to provide wireless access to communication services within different coverage areas to user devices, route communications between content providers and user devices, and facilitate handoffs between equipment of different coverage areas, among other operations. CVDS 320 can also comprise further elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, voicemail systems, or other communication and control equipment.

RAN 322 includes radio access equipment of a CDMA communication system, and includes providing CDMA voice and data links 340-341 in this example. RAN 322 can include base stations, wireless access nodes, routers, switches, as well as RF communication circuitry including antennas, amplifiers, filters, RF modulators, transceivers, and signal processing circuitry.

MSC 324 includes a mobile switching center of a CDMA cellular voice and data system, and can include communication or network interfaces, as well as computer systems, microprocessors, circuitry, or some other processing devices or software systems, and can be distributed among multiple processing devices. Examples of MSC 324 can also include software such as an operating system, logs, databases, utilities, drivers, networking software, and other software stored on a computer-readable medium. In further examples, MSC 324 can also include Call Session Control Function (CSCF) equipment, session initiation protocol (SIP) proxy systems, SIP routing systems, SIP monitoring systems, radio access network (RAN) equipment, E-UTRAN equipment, Mobility Management Entity (MME) equipment, database systems, or other systems. Although MSC 324 is employed for some of the functionality discussed in this example, in other examples different elements of CVDS 320 or RAN 322 can be utilized. The discussion regarding FIGS. 3-4 is not intended to limit the functionality to a particular element, and such processing can be handled across many elements of communication system 300.

Voicemail service 326 can include communication or network interfaces, as well as computer systems, microprocessors, circuitry, or some other processing devices or software systems, and can be distributed among multiple processing devices. Examples of voicemail service 326 can also include software such as an operating system, logs, databases, utilities, drivers, networking software, and other software stored on a computer-readable medium. Voicemail service 326 can also include user interfaces accessible over audio-controlled or tone-controlled menus.

Figure 4:
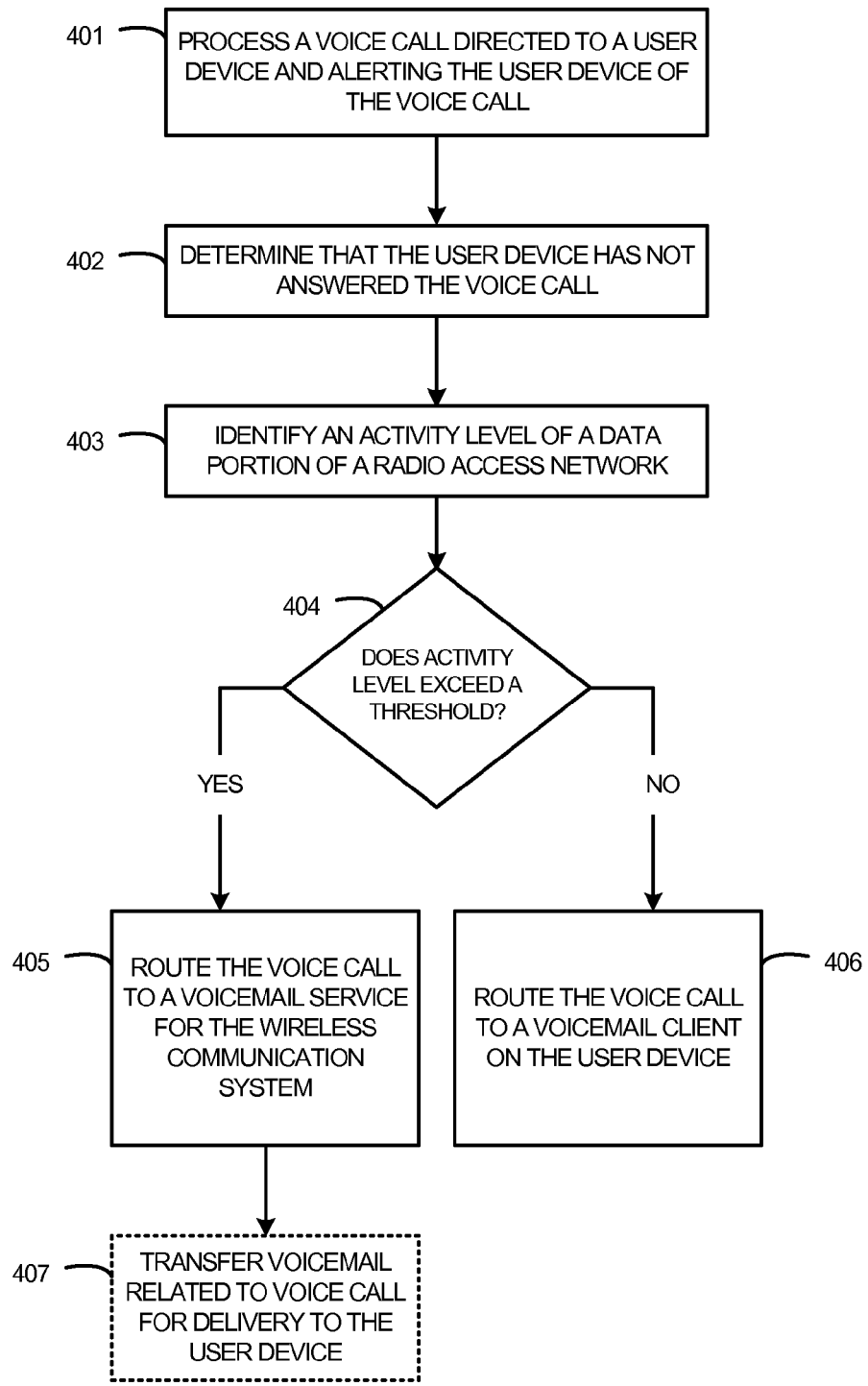
FIG. 4 is a flow diagram illustrating a method of operation of a communication system.

FIG. 4 is a flow diagram illustrating a method of operation of communication system 300. The operations of FIG. 4 are referenced below parenthetically. In FIG. 4, MSC 324 processes (401) a voice call directed to a user device and alerts the user device of the voice call. The voice call in this example originates at telephone 330, which can include a user of telephone 330 initiating a voice call to reach smartphone device 310. Telephone 330 can communicate over link 345 with CVDS 320, and link 345 can include further systems and equipment such as public switched telephone networks (PSTNs), wired and wireless links, or other equipment for routing the call placed at telephone 330 to CVDS 320. Once the voice call has been routed to CVDS 320, elements of CVDS 320 can further route the voice call to MSC 324 for further handling and routing. In this example, voice call route 331 indicates an example routing for the incoming voice call. MSC 324 alerts smartphone device 310 to the incoming voice call via signaling or messaging over RAN 322, which can include a call paging alert for receipt by smartphone device 310 related to the incoming voice call. Smartphone device 310 can receive the alert via wireless signaling provided over voice link 340, such as within overhead signaling portions of voice link 340.

MSC 324 determines (402) that the user device has not answered the voice call. Smartphone device 310 might not answer the incoming voice call due to being engaged in a pre-existing communication session, such as another pre-existing voice call, data session, or other communication session. Smartphone device 310 might not answer the incoming voice call due to a user command received by smartphone device 310 to ignore or to otherwise reject the incoming voice call, such as via a user interface of smartphone device 310. When smartphone device 310 does not answer the incoming voice call, such as via a user-initiated command received by smartphone device 310, after a predetermined number of rings, or after predetermined time period without an answer by smartphone device 310, then MSC 324 can determine that smartphone device 310 has not answered the incoming voice call. In further examples, RAN 322, MSC 324, or other elements of CVDS 320 might monitor a current state of smartphone device 310 and determine when smartphone device 310 is busy, in an inactive state, powered off, or engaged in a pre-existing communication session.

MSC 324 identifies (403) an activity level of a data portion of a radio access network. In this example, smartphone device 310 can communicate over any of voice link 340 and data link 341. RAN 322 can provide wireless access associated with voice link 340 and data link 341, as well as provide wireless access for other user devices, such as to many devices across one or more wireless coverage areas. The data portion of RAN 322, such as the data routing, processing, and access elements of RAN 322, including data link 341, experience varying activity levels during normal operation. These activity levels can increase or decrease based on an amount of data traffic carried over RAN 322, an amount of user devices receiving wireless access from RAN 322, or a time of day which indicates an increase in data traffic, among other indications of activity level. RAN 322 can monitor an activity level of the data portions of RAN 322, including an activity level of wireless links such as data link 341 or other data links associated with other user devices. RAN 322 can monitor an activity level of backhaul link 342. RAN 322 can provide information related to the activity levels of the various monitored elements for delivery to MSC 324. In other examples, MSC 324 can monitor the activity levels or monitor a different set of activity levels than RAN 322, and aggregate information related to various activity levels to identify the activity level of the data transfer portions of the radio access network. In yet other examples, data transfer portions of MSC 324 or CVDS 320 can be monitored to determine the activity level.

When activity level exceeds a threshold (404), MSC 324 routes (405) the voice call to a voicemail service for the wireless communication system. The activity level can include congestion levels, utilization levels, available bandwidth levels, quantity of user device levels, or other indication of activity levels, including combinations thereof. Various thresholds can be employed to indicate when the various activity levels have reached levels that influence the routing of incoming voice calls to various voicemail services, such as among voicemail client 312 or voicemail service 326. For example, the activity level can be a congestion level of data transfer or data routing portions of RAN 322 or of data transfer or data routing portions of CVDS 320, and the threshold can indicate when the congestion level exceeds a certain predetermined congestion level. When the activity level exceeds a threshold, the incoming voice call is routed to voicemail service 326 which is associated with CVDS 320.

This routing of the incoming voice call is illustrated by the example routing path 332 in FIG. 3. Once the incoming voice call is routed to voicemail service 326, then voicemail service 326 can responsively handle capturing a voicemail related to the incoming voice call. Capturing the voicemail can include recording a voice message as input at telephone 330, and can include other options such as indicated over a dial-tone or touch-tone input received at telephone 330 to control or modify the capture process or the voicemail.

When the activity level does not exceed the threshold (404), MSC 324 routes (406) the voice call to a voicemail client on the user device. In this example, when the activity level is below the threshold, then data transfer resources of CVDS 320 or RAN 322 indicate acceptable levels to route a voice call to voicemail client 312. Thus, MSC 324 can route the incoming voice call to voicemail client 312 which is included in smartphone device 310. This routing of the incoming voice call is illustrated by the example routing path 333 in FIG. 3. Once the incoming voice call is routed to voicemail client 312, then voicemail client 312 can responsively handle capturing a voicemail related to the incoming voice call. Capturing the voicemail can include recording a voice message as input at telephone 330, and can include other options such as indicated over a dial-tone or touch-tone input received at telephone 330 to control or modify the capture process or the voicemail.

In this example, routing path 333 includes routing over data link 341. Since telephone 330 is a voice device in this example, various equipment or systems associated with MSC 324 or CVDS 320 can convert the incoming call from a voice call suitable for routing over voice link 340 into data suitable for routing over data link 341. This conversion can include digitization and packetization of the incoming voice call into data packets for the incoming call suitable for transfer over data link 341. In further examples, telephone 330 can include data handling portions and can include the digitization and packetization of the incoming call, and thus transfer data packets for the incoming call instead of circuit-switched audio.

Optionally, voicemail service 326 transfers (407) voicemail related to voice call for delivery to the user device. Voicemail service 326 can transfer the voicemail that was captured in operation 405 in a digital format for delivery to smartphone device 310. Smartphone device 310 can transfer a request for the voicemail for delivery to voicemail service 326, and voicemail service 326 can responsively transfer the voicemail for delivery to smartphone device 310. In some examples, delivery of the voicemail into smartphone device 310 includes voicemail client 312 retrieving and storing the voicemail. In further examples, the delivery of the voicemail stored by voicemail service 326 occurs responsive to the activity level of RAN 322 or CVDS 302 decreasing below the threshold level. Thus, even though the voicemail is captured by voicemail service 326 during periods of high activity levels, the voicemail can later be transferred into voicemail client 312 once the high activity levels have subsided.

Although routes 331-333 are pictured in FIG. 3, it should be understood that different routes can be employed. For example, route 332 might not proceed through MSC 324 and may proceed through equipment of CVDS 320 to voicemail service 326. Likewise, route 333 might not proceed through MSC 324, and can proceed through data routing equipment of CVDS 320 or RAN 322, such as MME equipment, PDSN equipment, or packet routing equipment. MSC 324 can direct the activities of the various routing equipment even though the voice calls or voicemail data might not be physically routed through MSC 324.

Figure 5:
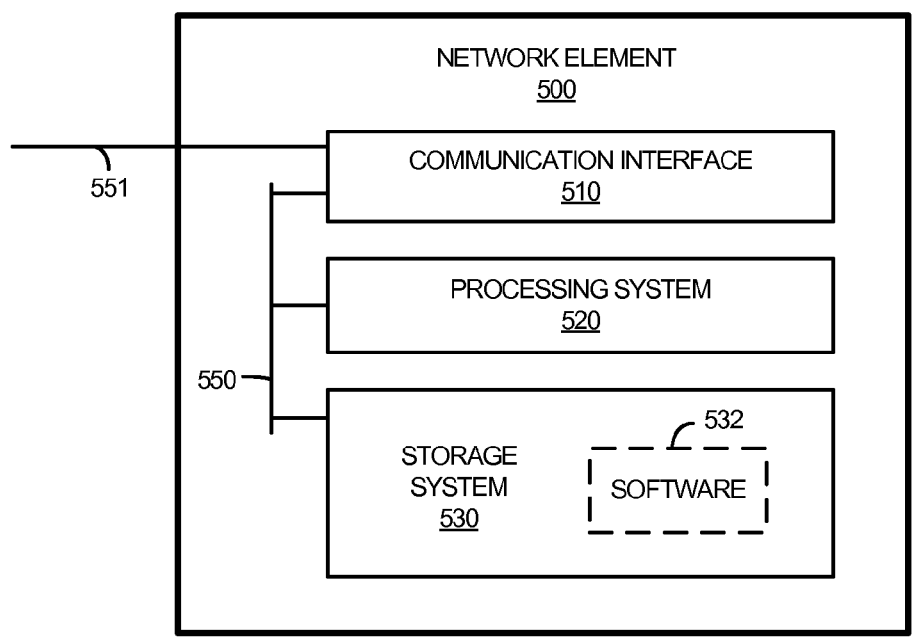
FIG. 5 is a block diagram illustrating a network element.

FIG. 5 is a block diagram illustrating a detailed view of network element 500. Network element 500 can include equipment and systems as discussed herein for network element 122 in FIG. 1, or MSC 324 of FIG. 3, although variations are possible. Network element 500 includes communication interface 510, processing system 520, and storage system 530. In operation, processing system 520 is operatively linked to communication interface 510 and storage system 530 by bus 550. It should be understood that discrete links can be employed, such as network links or other circuitry. Network element 500 can be distributed or consolidated among equipment or circuitry that together forms the elements of network element 500. Network element 500 can optionally include additional devices, features, or functionality not discussed here for purposes of brevity.

Communication interface 510 includes a network interface for communicating with one or more communication networks, such as wireless communication system 120 of FIG. 1 or elements 320, 322, and 326 of FIG. 3, among others. The network interface can include a T1 interface, or local or wide area network communication interfaces which can communicate over one or more Ethernet or Internet protocol (IP) links. Examples of communication interface 510 include network interface card equipment, transceivers, modems, and other communication circuitry. In this example, communication interface 510 communicates over link 551. Link 551 can include one or more communication links as described herein, such as that described for link 141-142 in FIG. 1 or links 342-344 in FIG. 3.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

Storage system 530 can comprise any computer readable storage media readable by processing system 520 and capable of storing software 532. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by network element 500 in general or processing system 520 in particular, direct network element 500 or processing system 520 to process a voice call directed to a user device and alert the user device of the voice call, determine that a user device has not answered a voice call, determine a status of a wireless communication system, initiate a connection for a voice call to a voicemail service for a wireless communication system, and initiate a connection for a voice call to a voicemail service on a user device, among other operations. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to process a voice call directed to a user device and alert the user device of the voice call, determine that a user device has not answered a voice call, determine a status of a wireless communication system, initiate a connection for a voice call to a voicemail service for a wireless communication system, and initiate a connection for a voice call to a voicemail service on a user device, among other operations.

In some implementations, the program instructions can include second program instructions that direct processing system 520 to process a voice call directed to a user device and alert the user device of the voice call, determine that the user device has not answered the voice call, and determine a status of the wireless communication system. When the status of the wireless communication system indicates a first condition, then the program instructions can direct processing system 520 to initiate a first connection for the voice call to a voicemail service for the wireless communication system. When the status of the wireless communication system indicates a second condition, then the program instructions can direct processing system 520 to initiate a second connection for the voice call to a voicemail service on the user device.

In general, software 532 can, when loaded into processing system 520 and executed, transform processing system 520 overall from a general-purpose computing system into a special-purpose computing system customized to process a voice call directed to a user device and alert the user device of the voice call, determine that a user device has not answered a voice call, determine a status of a wireless communication system, initiate a connection for a voice call to a voicemail service for a wireless communication system, and initiate a connection for a voice call to a voicemail service on a user device, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Network element 500 can also include other elements, such as user interfaces, computer systems, databases, distributed storage and processing elements, and the like. Network element 500 can be included in the equipment or systems of wireless communication system 120 of FIG. 1 or elements 320 or 322 of FIG. 3, or can be included in separate equipment or systems, including combinations thereof.

Figure 6:
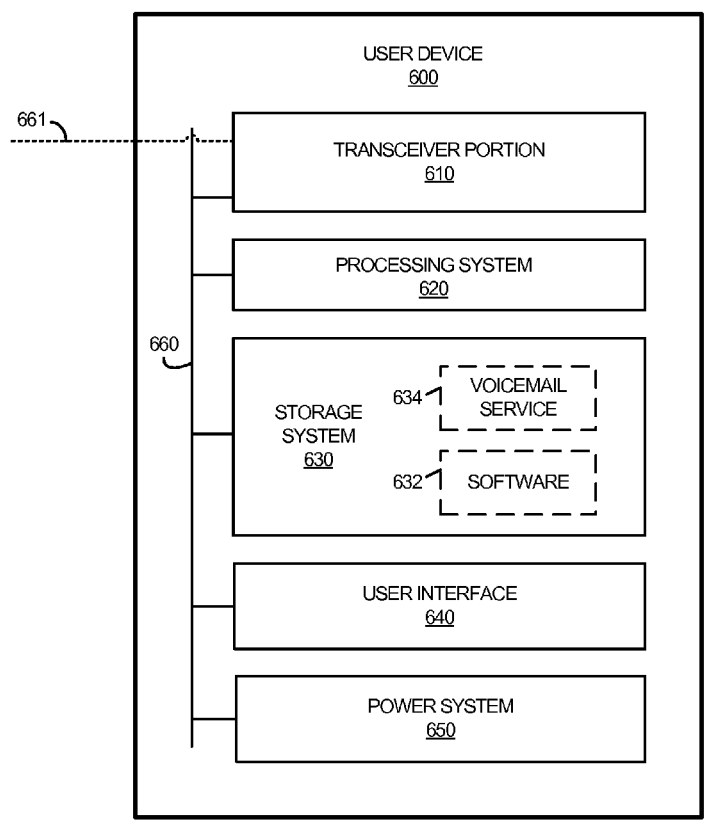
FIG. 6 is a block diagram illustrating a user device.

FIG. 6 is a block diagram illustrating user device 600, as an example of user device 110 found in FIG. 1 or smartphone device 310 found in FIG. 3, although user device 110 or smartphone device 310 could use other configurations. User device 600 includes transceiver portion 610, processing system 620, storage system 630, user interface 640, and power system 650. Transceiver portion 610, processing system 620, storage system 630, user interface 640, and power system 650 are shown to communicate over a common bus 660 for illustrative purposes. It should be understood that discrete links could be employed, such as data links, power links, RF links, or other links. User device 600 can be distributed or consolidated among equipment or circuitry that together forms the elements of user device 600. User device 600 can optionally include additional devices, features, or functionality not discussed here for purposes of brevity.

Transceiver portion 610 comprises one or more antenna elements and communication interface circuitry for communicating with wireless access nodes of a wireless communication network, such as with base stations of a cellular voice and data network. Transceiver portion 610 could include transceiver equipment and antenna elements for wirelessly exchanging user communications and overhead communications over the associated wireless link 661, among further wireless links. Transceiver portion 610 also receives command and control information and instructions from processing system 620 or user interface 640 for controlling the operations of wireless communications over wireless link 661. Wireless link 661 could use various protocols or communication formats as described herein for wireless links 140, 340, or 341, including combinations, variations, or improvements thereof.

Processing system 620 can comprise one or more microprocessors and other circuitry that retrieves and executes software 632 from storage system 630. Processing system 620 can be implemented within a single processing device but can also be distributed across multiple processing devices or sub-systems that cooperate in executing program instructions. Examples of processing system 620 include general purpose central processing units, application specific processors, and logic devices, as well as any other type of processing device, combinations, or variations thereof.

Storage system 630 can comprise any computer readable storage media readable by processing system 620 and capable of storing software 632 and voicemail service 634. Storage system 630 can include volatile and nonvolatile, removable and non-removable media implemented in any method or technology for storage of information, such as computer readable instructions, data structures, program modules, or other data. In addition to storage media, in some implementations storage system 630 can also include communication media over which software 632 and voicemail service 634 can be communicated. Storage system 630 can be implemented as a single storage device but can also be implemented across multiple storage devices or sub-systems co-located or distributed relative to each other. Storage system 630 can comprise additional elements, such as a controller, capable of communicating with processing system 620. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 632 and voicemail service 634 can be implemented in program instructions and among other functions can, when executed by user device 600 in general or processing system 620 in particular, direct user device 600 or processing system 620 to communicate with wireless access nodes over wireless links, and receive wireless access to communication services from wireless access nodes, and communicate over a wireless connection for voice calls to voicemail service 634, among other operations. Software 632 can include additional processes, programs, or components, such as operating system software, database software, or application software. Software 632 and voicemail service 634 can also comprise firmware or some other form of machine-readable processing instructions executable by processing system 620.

Voicemail service 634 can be a user software application and comprise executable instructions stored on a computer-readable medium of user device 600. Voicemail service 634 can include databases, storage locations for storing voicemail data, and user interface elements for interacting with a user of user device 600 to indicate, retrieve, and store voicemail data. In some examples, voicemail service 634 is installed onto user device 600 by a user of user device 600, or is preinstalled by a manufacturer or equipment retailer of user device 600. Voicemail service 634 can communicate with various processing, software, transceiver, and user interface elements of user device 600.

In at least one implementation, the program instructions can include first program instructions that direct processing system 620 to communicate with wireless access nodes over wireless links, and receive wireless access to communication services from wireless access nodes, and communicate over a wireless connection for voice calls to voicemail service 634.

In general, software 632 and voicemail service 634 can, when loaded into processing system 620 and executed, transform processing system 620 overall from a general-purpose computing system into a special-purpose computing system customized to communicate with wireless access nodes over wireless links, and receive wireless access to communication services from wireless access nodes, and communicate over a wireless connection for voice calls to voicemail service 634, among other operations. Encoding software 632 and voicemail service 634 on storage system 630 can transform the physical structure of storage system 630. The specific transformation of the physical structure can depend on various factors in different implementations of this description. Examples of such factors can include, but are not limited to the technology used to implement the storage media of storage system 630 and whether the computer-storage media are characterized as primary or secondary storage. For example, if the computer-storage media are implemented as semiconductor-based memory, software 632 and voicemail service 634 can transform the physical state of the semiconductor memory when the program is encoded therein. For example, software 632 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

User interface 640 includes equipment and circuitry for receiving user input and control, such as for engaging in voice calls or data sessions, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, or other human-interface equipment. User interface 640 also includes equipment to communicate information to a user of user device 600. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Power system 650 includes circuitry and a power source to provide power to the elements of user device 600. The power source could include a battery, solar cell, flywheel, capacitor, thermoelectric generator, chemical power source, dynamo, or other power source. In some examples, power system 650 receives power from an external source, such as a wall outlet or power adapter. Power system 650 also includes circuitry to condition, monitor, and distribute electrical power to the elements of user device 600.

Bus 660 comprises a physical, logical, or virtual communication link, capable of communicating data, control signals, and communications, along with other information. In this example, bus 660 also includes RF and power distribution elements, such as wires, circuit board traces, or other elements. In some examples, portions of bus 660 are encapsulated within the elements of transceiver portion 610, processing system 620, storage system 630, user interface 640, or power system 650, and can be a software or logical link. In other examples, bus 660 uses various communication media, such as air, space, metal, optical fiber, or some other signal propagation path, including combinations thereof. Bus 660 could be a direct link or might include various equipment, intermediate components, systems, and networks.

Referring back to FIG. 1, user devices 110 and 130 each can comprise one or more antennas, transceiver circuitry elements, and communication elements. The transceiver circuitry typically includes amplifiers, filters, modulators, and signal processing circuitry. User devices 110 and 130 can also each include user interface systems, memory devices, non-transitory computer-readable storage mediums, software, processing circuitry, or some other communication components. User devices 110 and 130 can each be a user device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

Wireless communication system 120 comprises communication and control systems for providing access to communication services for user devices. Wireless communication system 120 can provide communication services including voice calls, text messages, data access, or other communication services provided over cellular or wireless communication networks. In some examples, wireless communication system 120 includes equipment to provide wireless access to communication services within different coverage areas to user devices, route communications between content providers and user devices, and facilitate handoffs between equipment of different coverage areas, among other operations. Wireless communication system 120 can also comprise elements such as radio access network (RAN) equipment, E-UTRAN Node B equipment, eNodeB equipment, Evolved Node B equipment, Mobility Management Entity (MME) equipment, Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Network element 122 comprises systems and equipment to process a voice call directed to a user device and alert the user device of the voice call, determine that a user device has not answered a voice call, determine a status of a wireless communication system, initiate a connection for a voice call to a voicemail service for a wireless communication system, and initiate a connection for a voice call to a voicemail service on a user device, among other operations. Network element 122 can include communication or network interfaces, as well as computer systems, microprocessors, circuitry, or some other processing devices or software systems, and can be distributed among multiple processing devices. Examples of network element 122 can also include software such as an operating system, logs, databases, utilities, drivers, networking software, and other software stored on a computer-readable medium. Network element 122 can also include mobile switching centers (MSC), Call Session Control Function (CSCF) equipment, session initiation protocol (SIP) proxy systems, SIP routing systems, SIP monitoring systems, radio access network (RAN) equipment, Mobility Management Entity (MME) equipment, or other systems.

Voicemail service 124 can include communication or network interfaces, as well as computer systems, microprocessors, circuitry, or some other processing devices or software systems, and can be distributed among multiple processing devices. Examples of voicemail service 124 can also include software such as an operating system, logs, databases, utilities, drivers, networking software, and other software stored on a computer-readable medium. Voicemail service 124 can also include user interfaces accessible over audio-controlled or tone-controlled menus.

Communication links 141-143 each uses metal, glass, optical, air, space, or some other material as the transport media. Communication links 141-143 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 141-143 can each be a direct link or can include intermediate networks, systems, or devices, and can include a logical network link transported over multiple physical links.

Wireless link 140 can use the air or space as the transport media. Wireless link 140 comprises one or more wireless communication links provided over an associated wireless frequency spectrum or wireless frequency band, and can use various protocols. Wireless link 140 can comprise a wireless link such as Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Long Term Evolution (LTE), LTE Advanced, Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main wireless link for wireless link 140 is shown in FIG. 1, it should be understood that wireless link 140 is merely illustrative to show communication modes or wireless access pathways for user device 110. In other examples, further wireless links can be shown, with portions of the further wireless links shared and used for different communication sessions or different content types, among other configurations.

Communication links 140-143 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system, the method comprising:
   identifying a voice call directed to a user device and alerting the user device of the voice call, wherein the voice call is directed to the user device over a cellular voice link;
   determining that the user device has not answered the voice call;
   determining a data congestion status of cellular data link resources of the wireless communication system;
   when the data congestion status indicates data congestion above a threshold level, then routing the voice call over the wireless communication system to a voicemail service provided by the wireless communication system; and
   when the data congestion status indicates the data congestion below the threshold level, then establishing a data connection over the cellular data link resources of the wireless communication system with a voicemail client on the user device and routing the voice call to the voicemail client on the user device over the data connection.

2. The method of claim 1, wherein determining the data congestion status of the cellular data link resources of the wireless communication system comprises determining an activity level of data transfer resources of a radio access network of the wireless communication system.

3. The method of claim 2, wherein the data congestion is above the threshold level when the activity level of the data transfer resources exceed an activity threshold, and wherein the data congestion is below the threshold level when the activity level of the data transfer resources falling below the activity threshold.

4. The method of claim 1, wherein routing the voice call to the voicemail client on the user device comprises routing the voice call over a data wireless link for connection with the voicemail client on the user device.

5. The method of claim 1, further comprising:
   when the data congestion status initially indicated the data congestion above the threshold level and subsequently indicates the data congestion below the threshold level, then transferring voicemail data resulting from the voice call for delivery to the voicemail client on the user device, wherein the voicemail data resulting from the voice call is transferred from the voicemail service provided by the wireless communication system.

6. The method of claim 5, wherein transferring the voicemail data resulting from the voice call for delivery to the voicemail client on the user device comprises transferring the voicemail data for delivery into the voicemail client on the user device using the cellular data link resources of the wireless communication system.

7. The method of claim 1, further comprising:
   when the data congestion status initially indicated the data congestion above the threshold level and subsequently indicates the data congestion below the threshold level, then transferring an indication of voicemail data resulting from the voice call for delivery to the voicemail client on the user device; and
   responsive to a user election on a graphical user interface of the user device to retrieve the voicemail data, then transferring the voicemail data resulting from the voice call for delivery to the voicemail client on the user device using the cellular data link resources of the wireless communication system.

8. A wireless communication system, comprising:
   a network element configured to identify a voice call directed to a user device and alert the user device of the voice call, wherein the voice call is directed to the user device over a cellular voice link;
   the network element configured to determine that the user device has not answered the voice call;
   the network element configured to determine a data congestion status of cellular data link resources of the wireless communication system;
   when the data congestion status indicates data congestion above a threshold level, then the network element is configured to route the voice call over the wireless communication system to a voicemail service provided by the wireless communication system; and
   when the data congestion status indicates the data congestion below the threshold level, then the network element is configured to establish a data connection over the cellular data link resources of the wireless communication system with a voicemail client on the user device and route the voice call to the voicemail client on the user device over the data connection.

9. The wireless communication system of claim 8, comprising:
   the network element configured to determine an activity level of data transfer resources of the cellular data link resources of the wireless communication system to determine the data congestion status of a radio access network of the wireless communication system.

10. The wireless communication system of claim 9, wherein the data congestion is above the threshold level when the activity level of the data transfer resources exceed an activity threshold, and wherein the data congestion is below the threshold level when the activity level of the data transfer resources fall below the activity threshold.

11. The wireless communication system of claim 8, comprising:
   the radio access network of the wireless communication system configured to route the voice call over a data wireless link for connection with the voicemail client on the user device.

12. The wireless communication system of claim 8, comprising:
   when the data congestion status initially indicated the data congestion above the threshold level and subsequently indicates the data congestion below the threshold level, then the voicemail service provided by the wireless communication system is configured to transfer voicemail data resulting from the voice call for delivery to the voicemail client on the user device.

13. The wireless communication system of claim 12, comprising:
   the voicemail service provided by the wireless communication system configured to transfer the voicemail data for delivery into the voicemail client on the user device using the cellular data link resources of the wireless communication system.

14. The wireless communication system of claim 8, comprising:

when the data congestion status initially indicated the data congestion above the threshold level and subsequently indicates the data congestion below the threshold level, then the voicemail service provided by the wireless communication system is configured to transfer an indication of voicemail data resulting from the voice call for delivery to the voicemail client on the user device; and responsive to a user election on a graphical user interface of the user device to retrieve the voicemail data, then the voicemail service provided by the wireless communication system is configured to transfer the voicemail data resulting from the voice call for delivery to the voicemail client on the user device using the cellular data link resources of the wireless communication system.

* * * * *